(12) United States Patent
Gombert et al.

(10) Patent No.: US 9,262,190 B2
(45) Date of Patent: Feb. 16, 2016

(54) METHOD AND SYSTEM FOR MANAGING VIRTUAL MACHINES IN DISTRIBUTED COMPUTING ENVIRONMENT

(71) Applicant: Xerox Corporation, Norwalk, CT (US)

(72) Inventors: Barry G Gombert, Rochester, NY (US); Lee C Moore, Penfield, NY (US); Francisco M Valeriano, Torrance, CA (US)

(73) Assignee: Xerox Corporation, Norwalk, CT (US)

( * ) Notice: Subject to any disclaimer, the term of this patent is extended or adjusted under 35 U.S.C. 154(b) by 178 days.

(21) Appl. No.: 14/083,527

(22) Filed: Nov. 19, 2013

(65) Prior Publication Data

US 2015/0143363 A1    May 21, 2015

(51) Int. Cl.
*G06F 9/50*    (2006.01)
*G06F 9/455*    (2006.01)

(52) U.S. Cl.
CPC .......... *G06F 9/45533* (2013.01); *G06F 9/5083* (2013.01); *G06F 2209/508* (2013.01)

(58) Field of Classification Search
None
See application file for complete search history.

(56) References Cited

U.S. PATENT DOCUMENTS

| 7,000,141 | B1* | 2/2006 | Karlsson | G06F 9/5011 709/201 |
| 7,007,270 | B2* | 2/2006 | Martin et al. | 717/131 |
| 8,156,500 | B2* | 4/2012 | Helander | 718/104 |
| 8,321,870 | B2* | 11/2012 | Messier et al. | 718/102 |
| 2008/0189712 | A1* | 8/2008 | Boris | G06F 9/5083 718/103 |
| 2011/0302578 | A1* | 12/2011 | Isci | G06F 9/5077 718/1 |
| 2012/0005597 | A1* | 1/2012 | Eberlein | 715/751 |
| 2012/0203536 | A1* | 8/2012 | Gangemi | G06F 9/455 703/22 |
| 2013/0139169 | A1* | 5/2013 | Prabhakar et al. | 718/104 |
| 2013/0179895 | A1* | 7/2013 | Calder et al. | 718/104 |
| 2013/0235416 | A1 | 9/2013 | Moore et al. | |
| 2013/0242339 | A1 | 9/2013 | Jung et al. | |

* cited by examiner

*Primary Examiner* — Abdullah Al Kawsar (57) ABSTRACT

The disclosed embodiments illustrate methods and systems for managing virtual machines in a distributed computing environment. The method includes determining an estimated execution time for each job type in one or more jobs received from users and subscribing to virtual machines from the distributed computing environment to execute jobs of each type. The virtual machines are subscribed based on service level agreement (SLA) terms, quality of service (QoS) metrics, and/or the estimated execution time. Further, an actual job execution time for each job executed on an associated subscribed virtual machine is monitored. Thereafter, one or more under-performing virtual machines are identified based on the actual execution time, the estimated execution time, and a tolerance value for each type of job. The one or more under-performing virtual machines are released, while a new set of virtual machines are re-subscribed, such that the SLA terms and the QoS metrics are met.

20 Claims, 4 Drawing Sheets

METHOD AND SYSTEM FOR MANAGING VIRTUAL MACHINES IN DISTRIBUTED COMPUTING ENVIRONMENT

TECHNICAL FIELD

The presently disclosed embodiments are related to the field of distributed computing. More particularly, the presently disclosed embodiments are related to methods and systems for managing virtual machines in a distributed computing environment.

BACKGROUND

With the rapid growth of internet, organizations have significantly transformed how they operate their businesses. The organizations may subscribe to computational resources over the internet in a distributed computing environment (hereinafter, interchangeably referred to as "cloud network") that is managed by infrastructure service providers (such cloud services are commonly referred to as Infrastructure as a Service (IaaS)). The organizations may make use of the subscribed computational resources (such as storage, RAM (random access memory), processor, and the like) to run their customers' jobs. This helps in integrating the computational resources with the business processes of the organizations, without having to setup additional infrastructure. The computational resources may be subscribed by remotely invoking an on-demand service request over the internet.

An on-demand service request for computational resources is invoked based on the processing of a list of customer jobs received by organizations. Ostensibly, the organizations are required to manage the service request for the computational resources by addressing Service Level Agreement (SLA) and Quality of Service (QoS) requirements associated with the customer jobs.

SUMMARY

According to embodiments illustrated herein, there is provided a method for managing virtual machines in a distributed computing environment. The method includes determining, by one or more processors, an estimated execution time for each type of job in one or more jobs received from users. Thereafter, one or more virtual machines from a pool of virtual machines of the distributed computing environment are subscribed by the one or more processors to execute jobs of each type in the one or more received jobs. The one or more virtual machines are subscribed based on at least one of service level agreement (SLA) terms, quality of service (QoS) metrics, or the estimated execution time. Further, an actual job execution time for each job from the one or more received jobs executed on an associated subscribed virtual machine is monitored by the one or more processors. One or more under-performing virtual machines from the one or more subscribed virtual machines are identified by the one or more processors based on the actual execution time, the estimated execution time, and a tolerance value for each type of job in one or more received jobs. Thereafter, the one or more under-performing virtual machines are released to the distributed computing environment by the one or more processors. Further, a new set of virtual machines are re-subscribed from the pool of virtual machines of the distributed computing environment by the one or more processors, such that the SLA terms and the QoS metrics are met.

According to embodiments illustrated herein, there is provided a system for managing virtual machines in a distributed computing environment. The system includes one or more processors operable to determine an estimated execution time for each type of job in one or more jobs received from users. Thereafter, one or more virtual machines from a pool of virtual machines of the distributed computing environment are subscribed to execute jobs of each type in the one or more received jobs. The one or more virtual machines are subscribed based on at least one of service level agreement (SLA) terms, quality of service (QoS) metrics, or the estimated execution time. Further, an actual job execution time for each job from the one or more received jobs executed on an associated subscribed virtual machine is monitored. One or more under-performing virtual machines from the one or more subscribed virtual machines are identified based on the actual execution time, the estimated execution time, and a tolerance value for each type of job in one or more received jobs. Thereafter, the one or more under-performing virtual machines are released to the distributed computing environment. Further, a new set of virtual machines are re-subscribed from the pool of virtual machines of the distributed computing environment, such that the SLA terms and the QoS metrics are met.

According to embodiments illustrated herein, there is provided a computer program product for use with a computing device. The computer program product comprises a non-transitory computer readable medium, the non-transitory computer readable medium stores a computer program code for managing virtual machines in a distributed computing environment. The computer readable program code is executable by one or more processors in the computing device to determine an estimated execution time for each type of job in one or more jobs received from users. Thereafter, one or more virtual machines from a pool of virtual machines of the distributed computing environment are subscribed to execute jobs of each type in the one or more received jobs. The one or more virtual machines are subscribed based on at least one of service level agreement (SLA) terms, quality of service (QoS) metrics, or the estimated execution time. Further, an actual job execution time for each job from the one or more received jobs executed on an associated subscribed virtual machine is monitored. One or more under-performing virtual machines from the one or more subscribed virtual machines are identified based on the actual execution time, the estimated execution time, and a tolerance value for each type of job in one or more received jobs. Thereafter, the one or more under-performing virtual machines are released to the distributed computing environment. Further, a new set of virtual machines are re-subscribed from the pool of virtual machines of the distributed computing environment, such that the SLA terms and the QoS metrics are met.

BRIEF DESCRIPTION OF DRAWINGS

The accompanying drawings illustrate various embodiments of systems, methods, and various other aspects of the invention. Any person with ordinary skills in the art will appreciate that the illustrated element boundaries (e.g., boxes, groups of boxes, or other shapes) in the figures represent an example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit, the scope in any manner, wherein like designations denote similar elements, and in which.

DETAILED DESCRIPTION

The present disclosure is best understood with reference to the detailed figures and descriptions set forth herein. Various embodiments are discussed below with reference to the figures. However, those skilled in the art will readily appreciate that the detailed descriptions given herein with respect to the figures are simply for explanatory purposes, as methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment", "an embodiment", "at least one embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Definitions: The following terms shall have, for the purposes of this application, the respective meanings set forth below.

A "network" refers to a medium that interconnects various computing devices. Examples of the network include, but are not limited to, Local Area Network (LAN), Wireless Local Area Network (WLAN), Metropolitan Area Network (MAN), Wide Area Network (WAN), and the Internet. Communication over the network may be performed in accordance with various communication protocols such as Transmission Control Protocol and Internet Protocol (TCP/IP), User Datagram Protocol (UDP), and IEEE 802.11n communication protocols.

A "computing device" refers to a computer, a device that includes a processor/microcontroller and/or any other electronic component, or a device or a system that performs one or more operations according to one or more programming instructions. Examples of the computing device include, but are not limited to, a desktop computer, a laptop, a personal digital assistant (PDA), a mobile phone, a smart-phone, a tablet computer, and the like.

A "distributed computing environment" refers to an interconnected network of remote computing devices that co-operate with one another by sharing one or more computational resources to process one or more jobs. In an embodiment, a distributed computing environment includes a pool of virtual machines hosted on one or more computing devices of the distributed computing environment. Each virtual machine may have associated computational resources such as, but not limited to, processor instances, storage space, and RAM space. Further, communication and message passing within the distributed computing environment may be carried out using a message passing framework such as, but not limited to, Common Object Request Broker Architecture (CORBA), Distributed Component Object Model (DCOM), Remote Procedure Call (RPC), Remote Method Invocation (RMI), or any other message-oriented middleware. Hereinafter, the terms "distributed computing environment", "distributed network", "cloud computing environment", and "cloud network" may be interchangeably used.

"Service level agreement (SLA)" refers to terms in a contract between a service provider and a consumer (hereinafter, the terms "consumer" and "requestor" are interchangeably used). In an embodiment, the SLA may state the expectations agreed upon by the service provider and the consumer for the execution of one or more jobs by the service provider. For example, the SLA terms may include, but are not limited to, a measure of a cost, an accuracy measure, or a time of completion of a job. In an embodiment, the SLA terms may ensure that the service provider executes the one or more jobs in a timely, economical, and effective manner, as per the agreed expectations.

"Quality of Service (QoS) metrics" refers to a minimum performance level expected from the service provider in the execution of the one or more jobs. The QoS metrics ensure that the SLA terms associated with the one or more jobs are met.

"Computational resources" refer to resources utilized by a computing device to perform an operation. In an embodiment, the computational resources may include, but are not limited to, processor instances, storage space, and RAM space. In an embodiment, a virtual machine may include virtual computational resources such as processor instances, storage space, and RAM space that can be loaned out to the consumer for the purpose of executing jobs.

A "virtual machine (VM)" refers to a software that emulates a physical computing environment on a computing device upon which an operating system (OS) or program can be installed and run. The virtual machines are installed upon a virtualization layer such as a virtualization platform or a hypervisor that manages the virtual machine and handles communication between the virtual machine and the underlying physical hardware of the computing device. In an embodiment, multiple virtual machines may be implemented on the virtualization layer.

A "scheduler platform" refers to a scheduling application/service hosted on an application server of a distributed computing environment. The scheduler platform enables a distributed computing service provider to schedule and monitor the execution of jobs submitted by the consumer. The scheduler platform receives the one or more jobs from the consumer and manages the allocation of these jobs to one or more virtual machines in the distributed computing environment such that the one or more jobs may be executed in a timely, economical, and effective manner to ensure that the SLA terms are met.

"Subscribing" refers to an event of invoking a service request to access the one or more virtual machines in the distributed computing environment to execute the one or more jobs. In an embodiment, the scheduler platform may initiate a transaction with a distributed computing service provider. Based on the success of the transaction, the distributed computing service provider may grant access to the one or more virtual machines in the distributed computing environment to execute the one or more jobs.

"Turn-around time" refers to the time elapsed between the submission of the one or more jobs from the scheduler platform to the one or more virtual machines for execution and the reception of responses by the scheduler platform from the one or more virtual machines.

"Actual execution time" refers to a time taken by a virtual machine to execute a job completely. In an embodiment, the actual execution time is determined by an agent application installed on the virtual machine. In another embodiment, the actual execution time is determined by the scheduler platform on the basis of the turn-around time and estimated network delays.

"Tolerance value" refers to an acceptable deviation of the actual execution time for a type of job by a virtual machine from an estimated execution time for the type of job. In an embodiment, the tolerance value for each job type may be provided by the consumer. In another embodiment, the tolerance value for a job type may be determined as a factor of a standard deviation of a historical distribution of the actual execution time of jobs of a similar type.

"Threshold" refers to a threshold of acceptable execution time of jobs of a particular type executed on a virtual machine. In an embodiment, the threshold for each job type may be provided by the consumer. In another embodiment, the threshold for each job type may be determined as 1-standard deviation (i.e., mean±standard deviation) of a historical distribution of the actual execution time of jobs of a similar type.

"Job statistics" refers to statistics related to execution times of jobs executed on virtual machines. In an embodiment, job statistics of a particular job type for a virtual machine includes a median and a standard deviation of actual execution times for jobs of the particular type executed on the virtual machine. Additionally, in an embodiment, job statistics of a particular job type for a virtual machine may also include a median and a standard deviation of estimation errors of execution times of jobs on the virtual machine. In an embodiment, the estimation error is determined as a difference between an estimated execution time for the particular job type and an actual execution time for the job of that type executed on the virtual machine.

"Workflow of a job" refers to a predefined sequence of steps or sub-tasks that are required to be performed for processing the job. For example, a workflow associated with an image processing job may include steps such as image cropping, image enhancement, image tagging, and image compression.

Figure 1:
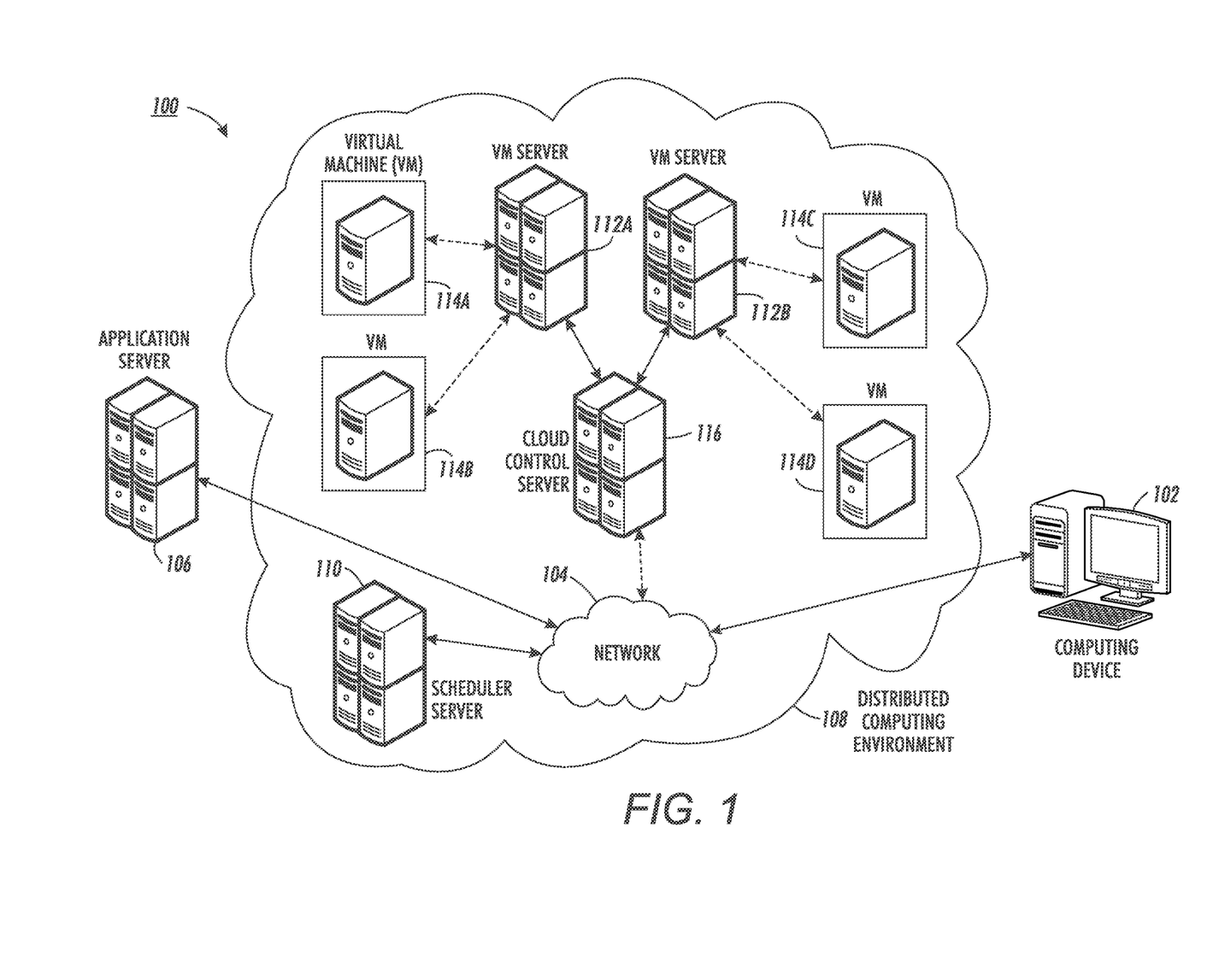
FIG. 1 illustrates a system environment in which various embodiments may be implemented.

FIG. 1 illustrates a system environment 100 in which various embodiments may be implemented. The system environment 100 includes a computing device 102, a network 104, an application server 106, and a distributed computing environment 108. Further, the distributed computing environment 108 includes a scheduler server 110, one or more virtual machine (VM) servers (such as 112A and 112B), and a cloud control server 116. The cloud control server 116 is connected to the network 104 and the one or more VM servers (i.e., 112A and 112B). Further, the cloud control server 116 is operable to manage the one or more VM servers (i.e., 112A and 112B). Each of the one or more VM servers (i.e., 112A and 112B) hosts one or more virtual machines (VMs) such as 114A, 114B, 114C, and 114D (hereinafter referred to as a pool of virtual machines 114). For example, the VM server 112A may host the virtual machines 114A and 114B, while the VM server 112B may host the virtual machines 114C and 114D. Further, each virtual machine in the pool of virtual machines 114 has associated computational resources such as, but not limited to, processor instances, storage space, and RAM space. In an embodiment, the pool of virtual machines 114 is connected to the network 104 through the one or more VM servers (such as 112A and 112B) and/or the cloud control server 116 (i.e., bridged network). In another embodiment, the pool of virtual machines 114 may be directly connected to the network 104 (i.e., network address translation (NAT)). Further, the scheduler server 110 is connected to the one or more virtual machine servers (112A and 112B) through the cloud control server 116, via the network 104. A user of the computing device 102 is hereinafter referred to as a requestor and may represent a human and/or a machine.

Although FIG. 1 shows only one type of the computing device 102 (i.e., a desktop computer), it will be apparent to a person with ordinary skills in the art that the disclosed embodiments can be implemented for a variety of computing devices including, but not limited to, a desktop computer, a laptop, a personal digital assistant (PDA), a mobile phone, a smart-phone, a tablet computer, and the like.

Further, although FIG. 1 shows only one cloud control server 116 and only one scheduler server 110, it will be apparent to a person with ordinary skills in the art that the distributed computing environment 108 may contain multiple cloud control server and multiple scheduler servers, without departing from the spirit of the disclosure. Additionally, though only two VM servers (i.e., 112A and 112B) and four virtual machines (i.e., 114A, 114C, 114C, and 114D) are shown within the distributed computing environment 108, the distributed computing environment 108 may include multiple VM servers, each hosting multiple virtual machines, without departing from the spirit of the disclosure.

The scheduler server 110 is a device or a computer that hosts a scheduler platform, and is interconnected to the computing device 102 and the pool of virtual machines 114 over the network 104. The scheduler platform receives one or more jobs from the computing device 102. Further, the scheduler platform subscribes to one or more virtual machines from the pool of virtual machines 114 for executing the one or more jobs. Thereafter, the scheduler platform forwards the one or more received jobs to the one or more subscribed virtual machines through the one or more virtual machine servers (112A and 112B) and/or the cloud control server 116. On receiving results for the one or more jobs from the one or more subscribed virtual machines, the scheduler server 110 forwards the received results to the computing device 102. Examples of the one or more jobs may include, but are not limited to, a word-processing job, a calculation job, a graphics/image/video processing job, an optical character recognition job, and the like.

In another embodiment, the scheduler platform may be implemented as an application/service hosted on the application server 106. In such a scenario, the application server 106 may act as the scheduler server 110.

A person skilled in the art would realize that the scope of the disclosure should not be limited to implementing the scheduling platform within the scheduler server 110. In an embodiment, the scheduler platform may be implemented as an application/service hosted within one of the virtual machines (such as 114A, 114B, 114C, and 114D) hosted by one of the VM servers (such as 112A and 112B). In another embodiment, the scheduling platform may be hosted by the cloud control server 116.

The one or more virtual machine servers (112A and 112B) are configured to host the pool of virtual machines 114. In an embodiment, each virtual machine server (e.g., 112A) includes a hypervisor that controls the interaction of the virtual machines (e.g., 114A and 114B), which are hosted by the virtual machine server (i.e., 112A), and hardware of the virtual machine server (i.e., 112A). Examples of the hypervisor include, but are not limited to, VMWARE®, KVM®, or XEN®. Further, in an embodiment, the hypervisor manages the pool of virtual machines 114 by mapping the computational resources associated with each virtual machine in the pool of virtual machines 114 to the hardware resources of the one or more virtual machine servers (112A and 112B).

In an embodiment, one or more virtual machines from the pool of virtual machines 114 may be loaned out for execution of the one or more jobs. As each virtual machine has associated computational resources, the loaning out of the one or more virtual machines is equivalent to loaning out of the associated computational resources of the one or more virtual machines. For example, the associated computational resources of virtual machine 114a may include 4 GHz quad core processors, 10 TB storage space, and 8 GB RAM space. Loaning out of the virtual machine 114A may entail loaning out the associated computational resources of the virtual machine 114A (i.e., 4 GHz quad core processors, 10 TB storage space, and 8 GB RAM space).

In an embodiment, the cloud control server 116 is operable to manage the one or more VM servers 112A and 112B. The cloud control server 116 may interact with the one or more VM servers (112A and 112B) to determine the capacity of the VM servers. Based on the determined capacity, the cloud control server 116 identifies a virtual machine server (e.g., 112a) that has the capability to host a required virtual machine. Thereafter, the cloud control server 116 instructs the hypervisor of the VM server to create the required virtual machine (e.g., 114A).

Figure 2:
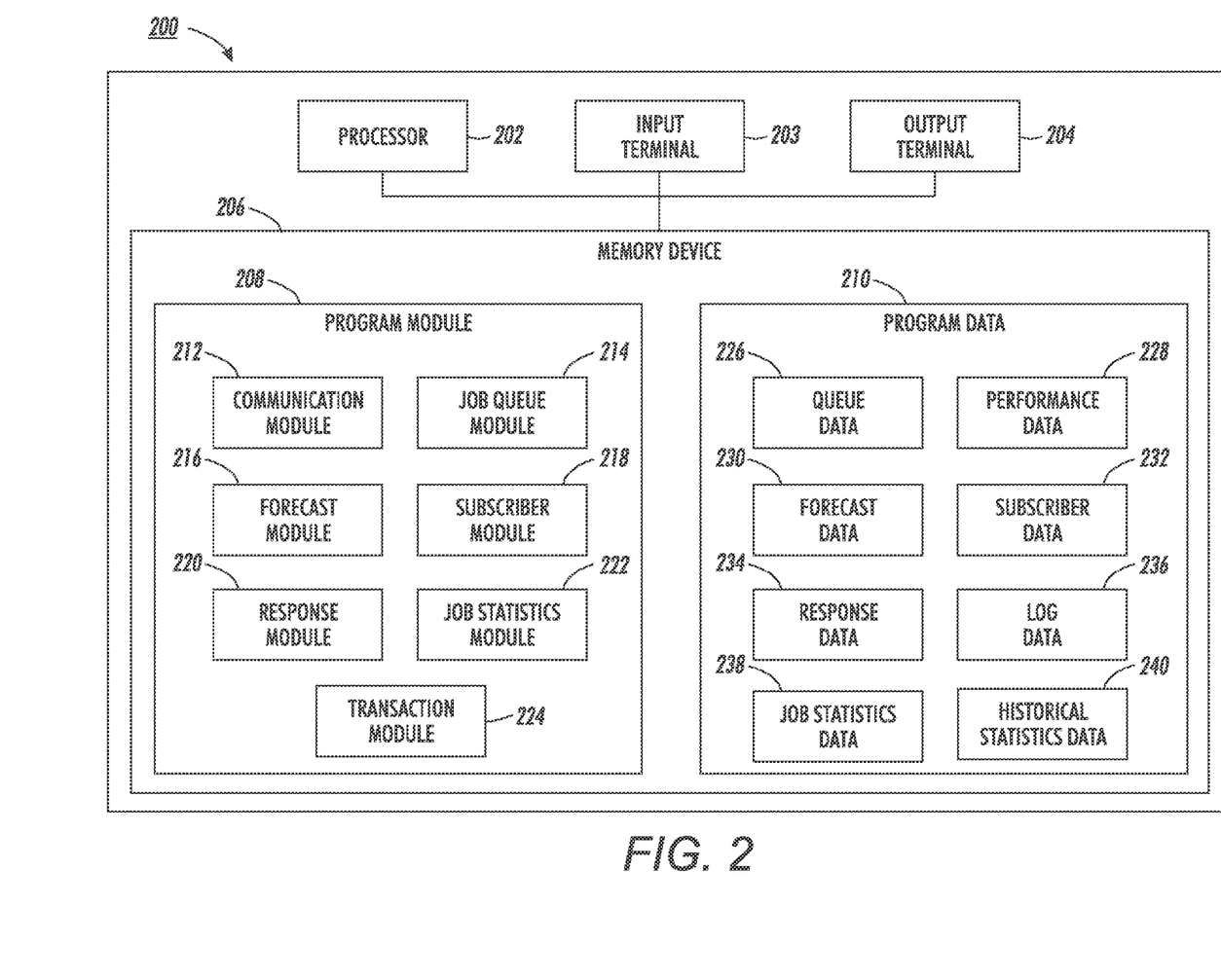
FIG. 2 is a block diagram of a system, in accordance with at least one embodiment.

FIG. 2 is a block diagram of a system 200, in accordance with at least one embodiment. The system 200 includes a processor 202, an input terminal 203, an output terminal 204, and a memory device 206. The system 200 may congruently be implemented on the computing device 102, the scheduler server 110, the application server 106, the cloud control server 116, or the virtual machine 114A. However, for the ongoing description, the system 200 has been considered as the scheduler server 110.

The processor 202 is coupled to the input terminal 203, the output terminal 204, and the memory device 206. The processor 202 is configured to fetch a set of instructions stored in the memory device 206 and execute the set of instructions. The processor 202 may be realized through a number of processor technologies known in the art. Examples of the processor 202 include, but are not limited to, x86 processor, RISC processor, ASIC processor, CSIC processor, or any other processor.

In an embodiment, when the system 200 corresponds to the computing device 102, the input terminal 203 is configured to receive input from the requestor. The input may correspond to the submission of the one or more jobs to the computing device 102. Examples of the input terminal 203 include, but are not limited to, a touch screen, a keyboard, a mouse, etc. In an embodiment, when the system 200 corresponds to the scheduler server 110, the input terminal 203 may correspond to a receiver that is configured to receive the one or more jobs from the computing device 102 over the network 104.

The output terminal 204 is configured to forward the results of the one or more jobs that are completely executed to the requestor. Thus, the output terminal 204 may correspond to a transmitter within the scheduler server 110 that is configured to forward the results of the one or more completely executed jobs to the computing device 102 over the network 104.

The memory device 206 is configured to store data and a set of instructions. Some of the commonly known memory device implementations can be, but are not limited to, a random access memory (RAM), read only memory (ROM), a hard disk drive (HDD), and a secure digital (SD) card. The memory device 206 includes a program module 208 and a program data 210.

The program module 208 includes a communication module 212, a job queue module 214, a forecast module 216, a subscriber module 218, a response module 220, a job statistics module 222, and a transaction module 224. Although various modules of the program module 208 have been shown in separate blocks, it may be appreciated that one or more of the modules may be implemented as an integrated module performing the combined functions of the constituent modules.

The program data 210 includes a queue data 226, a performance data 228, a forecast data 230, a subscriber data 232, a response data 234, a log data 236, a job statistics data 238, and a historical statistics data 240.

In operation, the communication module 212 receives the one or more jobs from the requestor through the input terminal 203. The one or more received jobs are then stored in the queue data 226. Further, the communication module 212 forwards a response associated with each job that is completely executed to the requestor through the output terminal 204. The communication module 212 includes various protocol stacks such as, but not limited to, TCP/IP, UDP, and 2G, 3G, or 4 G communication protocols. The communication module 212 transmits and receives the messages/data through the output terminal 204 and the input terminal 203 respectively, in accordance with such protocol stacks.

The job queue module 214 retrieves the one or more jobs currently in the queue data 226 and identifies SLA terms and QoS metrics associated with each of the one or more jobs. Based on the identified SLA terms and QoS metrics, the job queue module 214 determines one or more job types of the one or more jobs. One job from each job type is forwarded to the pool of virtual machines 114 for processing. The virtual machines in the pool of virtual machines 114 may utilize their associated computational resources such as processor, RAM, and storage, to process the jobs and generate results. Thereafter, the pool of virtual machines 114 may return the result of each job to the job queue module 214. Furthermore, the job queue module 214 determines execution time for each job type based on a turn-around time associated with the respective job and an estimated network delay. The execution time for each job type is stored in the performance data 228.

A person skilled in the art would understand that the scope of the disclosure should not be limited to the determination of the one or more job types based on the SLA terms and the QoS metrics. The one or more job types may be determined based on one or more other factors, for example, a workflow type of the one or more jobs, type and size of data associated with the one or more jobs, etc. Examples of such job types may include, but are not limited to, a word-processing job, a calculation job, a graphics/image/video processing job, an optical character recognition job, and the like.

The forecast module 216 is operable to determine an estimated execution time for each job type. In an embodiment, the forecast module 216 retrieves the performance data 228 for the one or more job types and determines the estimated execution time for each job type based on the retrieved performance data 228. In another embodiment, the forecast module 216 retrieves the historical statistics data 240 and determines the estimated execution time for each job type based on the retrieved historical statistics data 240. In an embodiment, the historical statistics data 240 includes a log of actual execution time that was consumed by the virtual machines 114 to execute previously received jobs of similar types. The estimation of execution time is described later in conjunction with FIG. 3A and FIG. 3B. The estimated execution time for each job type is stored in the forecast data 230. Further, the forecast module 216 also determines a tolerance value for each job type. In an embodiment, the tolerance value for a job type can be determined from the SLA terms and the QoS metrics of that job type. In another embodiment, the tolerance value for a job type may be determined as a factor of a standard deviation of the actual execution times associated with the previously received jobs. In yet another embodiment, the requestor or a system administrator may provide the tolerance value for each type of job. Additionally, the forecast module 216 determines a threshold of actual execution time for each job type as 1-standard deviation (i.e., mean+standard deviation) of the actual execution time associated with previously received jobs. In another embodiment, the requestor or the system administrator may provide the threshold for each type of job. The forecast module 216 stores the tolerance value and the threshold for each job type in the job statistics data 238.

A person skilled in the art would understand that the scope of the disclosure should not be limited to the determination of the tolerance value and the threshold as described above. The tolerance value and the threshold may be determined using any other technique without departing from the spirit of the disclosure.

The subscriber module 218 retrieves the forecast data 230 and identifies the one or more virtual machines from the pool of the virtual machines 114 to execute jobs of each type in the queue data 226. The identification of the one or more virtual machines for execution of a type of job is determined based on the SLA terms, the QoS metrics, the estimated execution time of the job type, the tolerance value for each job type, and the threshold for each job type. The subscriber module 218 sends a request to a cloud network provider (hereinafter, interchangeably referred to as a distributed computing service provider) to provide access to the one or more identified virtual machines (e.g., the virtual machine 114B). After access is granted, the job queue module 214 transmits jobs of each type to the one or more identified virtual machines (e.g., the virtual machine 114B) for the execution of these jobs. Information pertaining to the allocation of the jobs of each type to the one or more identified virtual machines is stored in the subscriber data 232. Further, the job queue module 214 transmits any incoming jobs in the queue data 226 to the one or more identified virtual machines (e.g., the virtual machine 114B) for execution based on their respective types. In an embodiment, the subscriber data 232 may further include information related to a start time of a service, a cost, a capacity, and the like.

The response module 220 receives responses from the one or more virtual machines (e.g., the virtual machine 114B) currently servicing jobs of a particular type. Further, the response module 220 stores the received responses for completed executed jobs to the response data 234. The response module 220 determines the actual execution time for each job from the received responses. In an embodiment, the response module 220 maintains a transmission timestamp indicative of the time at which a job is transmitted to the one or more virtual machines (e.g., the virtual machine 114B) and a reception timestamp indicative of the time at which the response for the job is received from the one or more virtual machines (e.g., the virtual machine 114B). Thereafter, in an embodiment, the response module 220 may determine the actual execution time for each job as:

$$\text{(Reception timestamp -Transmission timestamp)-Estimated network delay} \quad (1)$$

The estimated network delay may be determined using any technique known in the art. For example, the estimated network delay may be determined based on real-time network traffic data collected by network routers. In another embodiment, the actual execution time for each job may be provided by an agent application installed on the one or more virtual machines (e.g., the virtual machine 114B). Based on the actual execution time associated with a job of a particular type and the estimated execution time associated with a particular job type, the response module 220 determines an estimation error. The response module 220 stores the determined estimation error for each of the one or more jobs as the log data 236. The response module 220 also stores the actual execution times for each job of each type in the log data 236. Additionally, the response module 220 prompts the communication module 212 to forward the received responses for each completely executed job to the requestor.

The job statistics module 222 is operable to retrieve the log data 236 and determine a median and a standard deviation of the determined estimation errors associated with execution of jobs of each type. Additionally, in an embodiment, the job statistics module 222 may also calculate a median and a standard deviation of the actual execution times for jobs of each type. The computed medians and standard deviations are stored in the job statistics data 238. In an embodiment, the job statistics module 222 determines one or more under-performing virtual machines (e.g., the virtual machine 114B) based on the tolerance value, the threshold, the medians, and the standard deviations stored in the job statistics data 238. Furthermore, the job statistics module 222 prompts the transaction module 224 on the one or more under-performing virtual machines (e.g. N the virtual machine 114b) and updates the subscriber data 232.

The transaction module 224 retrieves the subscriber data 232 and transacts with the distributed computing service provider to avail a new virtual machine (e.g., the virtual machine 114a) from the distributed computing environment 108, if the transaction module 224 receives a prompt from the job statistics module 222. Further, the transaction module 224 communicates with the distributed computing service provider to halt the execution of the jobs currently being executed by the one or more under-performing virtual machines. Accordingly, the transaction module 224 updates the subscriber data 232.

Figure 3A:
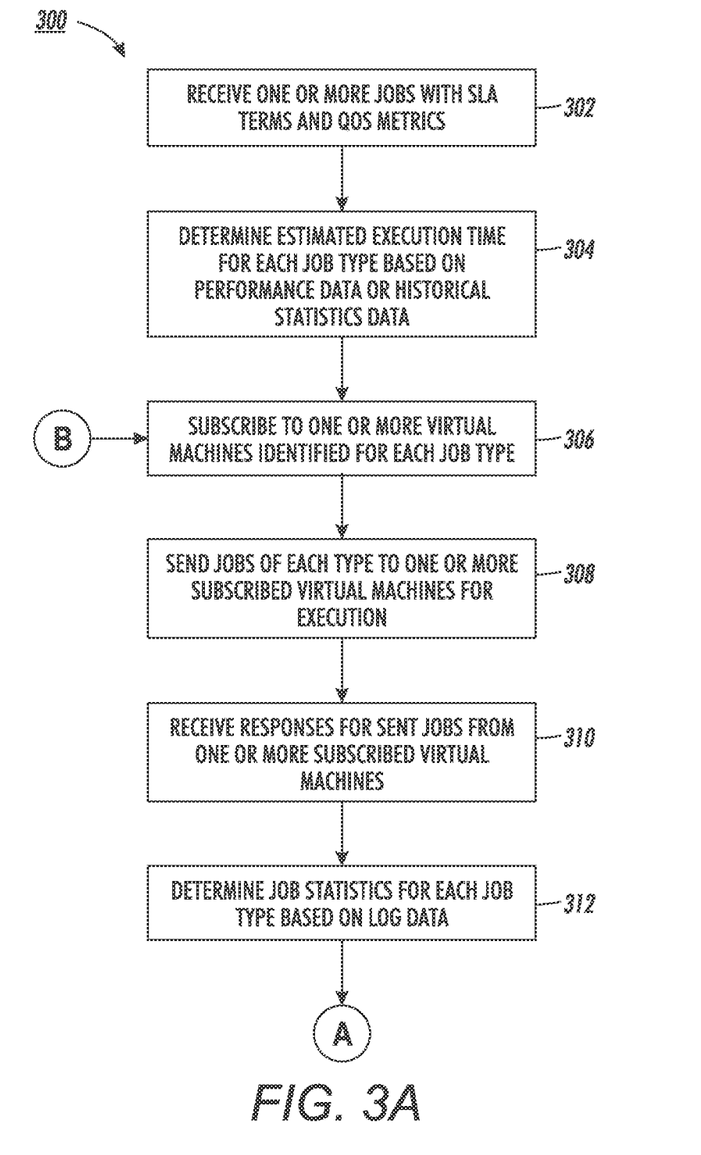
FIG. 3A and FIG. 3B depict a flow diagram that illustrates a method for managing virtual machines in a distributed computing environment, in accordance with at least one embodiment.
Figure 3B:
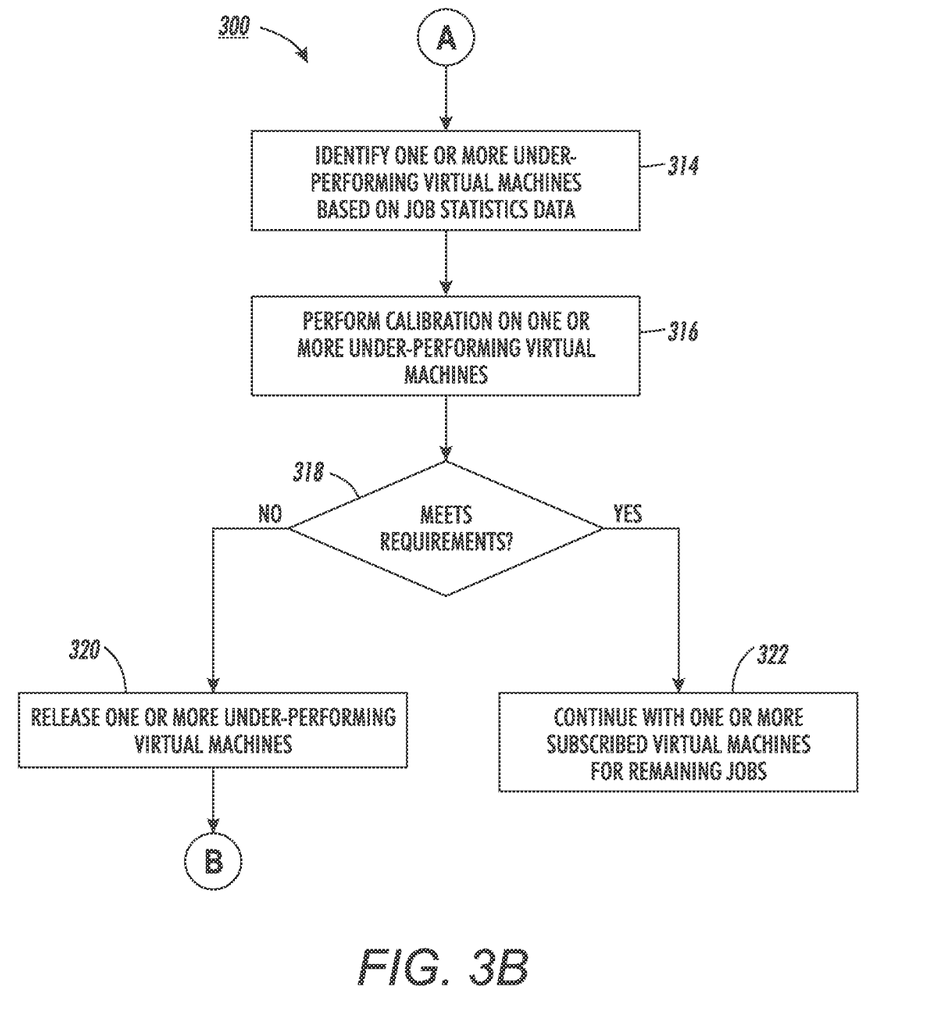

FIG. 3a and FIG. 3b illustrate a logic flow diagram 300 that illustrates a method for managing virtual machines in the distributed computing environment 108, in accordance with at least one embodiment.

At step 302, the one or more jobs are received with the SLA terms and the QoS metrics. In an embodiment, the communication module 212 receives the one or more jobs with the SLA terms and the QoS metrics from the requestor.

As explained earlier with reference to FIG. 2, the communication module 212 stores the one or more received jobs in the queue data 226. Subsequently, the job queue module 214 retrieves the one or more jobs from the queue data 226. As explained earlier, the job queue module 214 may determine the one or more job types in the one or more jobs based on the SLA terms and the QoS metrics associated with the one or more jobs. For example, jobs $J_1$, $J_2$, $J_3$, and $J_4$ are received. SLA terms associated with these four jobs may be as illustrated below:

$J_1$: SLA terms—Execution within 20 ms;
$J_2$: SLA terms—Execution within 45 ms;
$J_3$: SLA terms—Execution within 130 ms; and
$J_4$: SLA terms—Execution within 90 ms.

Based on the SLA terms of these four jobs, the job queue module 214 determines that jobs $J_1$ and $J_2$ have execution time less than 50 ms. Further, the job queue module 214 determines that $J_4$ and $J_3$ have execution time more than 50 ms. Hence, the job queue module 214 may categorize the jobs $J_1$ and $J_2$ to a first job type, and the jobs $J_3$ and $J_4$ to a second job type.

In an embodiment, post determination of the one or more job types, the job queue module 214 forwards one job from each determined job type to the pool of virtual machines 114. Each virtual machine in the pool of virtual machines 114 executes the one job of each job type to generate respective responses. Thereafter, the job queue module 214 receives the responses for the forwarded jobs from the pool of virtual machines 114. Based on the received responses, the job queue module 214 determines an execution time for each job type and stores the determined execution time for each job type in the performance data 228. In an embodiment, the job queue module 214 utilizes equation 1 to determine the execution time for each job type. The following table illustrates an example of determination of the execution times for each job type:

TABLE 1

Determination of execution time for job types on virtual machines

| Job type | Virtual machine | Turn-around time (in ms) | Execution time (in ms) |
|---|---|---|---|
| $T_1$ | $VM_1$ | 15 | 12 |
| | $VM_2$ | 10 | 7 |
| | $VM_3$ | 18 | 15 |
| $T_2$ | $VM_1$ | 37 | 34 |
| | $VM_2$ | 29 | 26 |
| | $VM_3$ | 26 | 23 |

Referring to Table 1, one job from each job type (say job types $T_1$ and $T_2$) is executed by each virtual machine in the pool of virtual machines (say $VM_1$, $VM_2$, and $VM_3$). Considering a network delay of 3 milliseconds (ms), it can be observed that $VM_1$ consumes 12 ms to execute the job of type $T_1$. Similarly, the virtual machine $VM_2$ consumes 26 ms to execute the job of type $T_2$, and so on.

At step 304, the estimated execution time for each job type is determined based on at least one of the performance data 228 or the historical statistics data 240. In an embodiment, the forecast module 216 retrieves the performance data 228 and determines the estimated execution time for each job type based on the retrieved performance data 228. In an embodiment, the forecast module 216 may determine the estimated execution time for each job type based on at least one of a mean or a standard deviation of the execution time determined by the job queue module 214 for each job type (extracted from the performance data 228). For example, referring to Table 1, the mean of the execution time for job type $T_1$ is 14.3 ms. Therefore, forecast module 216 may determine the estimated execution time for the job type $T_1$ as 14.3 ms. In another embodiment, the forecast module 216 may determine the estimated execution time for each job type based on a standard deviation of the execution time of each job type. For example, referring to Table 1, the standard deviation of job type $T_1$ is 4.04 ms. The estimated execution time for the job type $T_1$ will be 14.3±4.04 ms. Similarly, the forecast module 216 retrieves the historical statistics data 240 and determines the estimated execution time for each job type based on execution time of the each similar job type retrieved from historical statistics data 240. In an embodiment, the forecast module 216 determines at least one of a mean, a median, or a standard deviation of the actual execution time for the previously received jobs to determine the estimated execution time. Additionally, in an embodiment, the forecast module 216 may determine the estimated execution time of a job type based on one or more parameters associated with the job type. Examples of such parameters include, but are not limited to, average amount of data associated with the job type, complexity of data processing associated with the job type, etc. Hence, the forecast module 216 may determine the estimated execution time of each job type based on at least one of the retrieved performance data 228, the retrieved historical statistics data 240, or the one or more parameters associated with the job type. The forecast module 216 stores the estimated execution time for each job type in the forecast data 230.

A person skilled in the art would understand that the scope of the disclosure should not be limited to determining the estimated execution time of each job type as described in step 304. The estimated execution time may be determined using any other technique without departing from the spirit of the disclosure.

Further, the forecast module 216 also determines a tolerance value for each job type. In an embodiment, the forecast module 216 may determined the tolerance value for a job type based on the SLA terms and the QoS metrics of that job type. In another embodiment, the forecast module 216 determines the tolerance value based on the retrieved historical statistics data 240. Accordingly, in an embodiment the forecast module 216 may determine the tolerance value for a job type as a factor of a standard deviation of the historical distribution of the actual execution times of jobs of a similar type in the historical statistics data 240. For example, if the standard deviation of a similar job type in the historical distribution is 4.04 ms, the forecast module 216 may determine the tolerance value for the job type as 2 times the standard deviation value (i.e., 8.08 ms). In yet another embodiment, the requestor may provide the tolerance value for each type of job. Additionally, the forecast module 216 determines a threshold for each job type as 1-standard deviation (i.e., mean±standard deviation) of the historical distribution of the actual execution times of jobs of a similar type in the historical statistics data 240. For example, if the standard deviation of a similar job type in the historical distribution is 4.04 ms, the forecast module 216 may determine the threshold for the job type as 1-standard deviation value (i.e., 14.3±4.04 ms). In another embodiment, the requestor may provide the threshold for each type of job. The forecast module 216 stores the tolerance value and the threshold for each job type in the job statistics data 238.

A person skilled in the art would understand that the scope of the disclosure should not be limited to determining the tolerance value and the threshold as described in step 304. The tolerance value and the threshold may be determined using any other technique without departing from the spirit of the disclosure.

Thereafter, based on the SLA terms, the QoS metrics, the estimated execution time of each job type, and the execution time of the one job of each job type on each virtual machine, the subscriber module 218 identifies the one or more virtual machines to be subscribed for each job type. For example, the virtual machines $VM_2$ and $VM_3$ have the least execution time for the job types $T_1$ and $T_2$ respectively, as compared to the other virtual machines. Let the estimated execution time for job type $T_1$ be 9 ms. Referring to Table 1, the virtual machine $VM_2$ consumes 7 ms to execute the one job of the job type $T_1$. Therefore, the virtual machine $VM_2$ may be identified for the job type $T_1$ by the subscriber module 218. Similarly, the virtual machine $VM_3$ (which consumes 23 ms to execute jobs of type $T_2$) may be identified for the job type $T_2$ considering the estimated execution time for job type $T_2$ as 28 ms.

At step 306, the one or more virtual machines are subscribed for each job type based on the identification. In an embodiment, the subscriber module 218 subscribes to the one or more identified virtual machines for each job type. The subscriber module 218 sends a request to the distributed computing service provider to provide access to the one or more virtual machines from the pool of the virtual machines 114. After access is granted, the one or more virtual machines are made available to execute the jobs of each type in the queue data 226. Further, the job queue module 214 forwards any incoming jobs in the queue data 226 to the one or more subscribed virtual machines for execution based on their respective types. The subscriber module 218 stores the information pertaining to the allocation of the jobs of each type to the one or more identified virtual machines in the subscriber data 232.

In a scenario where the request for the one or more virtual machines is denied by the distributed computing service provider, the subscriber module 218 identifies a second best virtual machine to execute jobs of a particular job type. For example, in case access to the virtual machine $VM_3$ is denied, the subscriber module 218 may identify the virtual machine $VM_2$ for the job type $T_2$ as the execution time of $VM_2$ for the one job of the job type $T_2$ (i.e., 26 ms) is less than the estimated execution time for the job type $T_2$ (i.e., 28 ms).

At step 308, jobs of each type are sent to the one or more subscribed virtual machines for execution. In an embodiment, the job queue module 214 transmits the one or more jobs of each type to the virtual machine subscribed for that job type. For example, one or more jobs for job type $T_1$ are sent to $VM_2$ for execution.

At step 310, the responses are received from the one or more subscribed virtual machines for the sent jobs. In an embodiment, the response module 220 is operable to receive the responses from the one or more subscribed virtual machines. Further, the response module 220 stores the responses as the response data 234. The response module 220 prompts the communication module 212 to forward the responses to the requestor. Additionally, the response module 220 determines the actual execution time for each job of a particular job type using equation 1. Thereafter, the response module 220 determines the estimation error for each job based on the difference between the estimated execution time for the job type and the actual execution time for the job. The estimation errors are stored as the log-record in the log data 236. Further, the response module 220 also stores the actual execution times for each job of each type in the log data 236.

At step 312, job statistics for each job type are determined based on the log data 236. In an embodiment, the job statistics module 222 determines the job statistics. In an embodiment, job statistics of a particular job type for a virtual machine includes a median and a standard deviation of actual execution times for jobs in each job type executed on the virtual machine. In an embodiment, the job statistics module 222 retrieves the actual execution times for jobs of each type from the log data 236. Thereafter, for each job type, the job statistics module 222 sorts the retrieved actual execution times for the jobs of that type and utilizes the following equation to determine the median of the actual execution times for the jobs of that job type:

$$\text{Median} = \frac{(n+1)}{2} \text{ th value} \tag{2}$$

where
n represents the number of jobs of the job type.

In an embodiment, for each job type, the job statistics module 222 determines the standard deviation of the actual execution times of jobs of a particular job type using the following equation:

$$\sigma = \sqrt{\frac{1}{N} \sum_{i=1}^{N} (x_i - \mu)^2} \tag{3}$$

where
$x_i$ represents an actual execution time for the $i^{th}$ job of the job type x;
$\mu$ represents a mean of the actual execution time values of all jobs of the job type x; and
N represents the total number of jobs of the job type x.

Additionally, in an embodiment, job statistics of a particular job type for a virtual machine may also include a median and a standard deviation of the estimation errors of execution times of jobs of the particular type executed on the virtual machine. In an embodiment, the job statistics module 222 retrieves the estimation errors for jobs of each type from the log data 236 and calculates the median and the standard deviation of the estimation errors for jobs of each type using equations 2 and 3, respectively. The job statistics module 222 stores the medians and the standard deviations of actual execution times and estimation errors for each job type in the job statistics data 238. Further, in an embodiment, the job statistics module 222 may update the historical statistics data 240 based on the medians and the standard deviations of actual execution times and estimation errors for each job type stored in the job statistics data 238.

At step 314, the one or more under-performing virtual machines are identified based on job statistics data 238. In an embodiment, the job statistics module 222 identifies a virtual machine as an under-performing virtual machine based on the job statistics data 238. In an embodiment, the job statistics module 222 may identify a virtual machine as an under-performing virtual machine if the standard deviations of the actual execution times for jobs of a particular type executed on the virtual machine exceeds the tolerance value for the job type. For example, if the standard deviation of actual execution time for jobs of job type $T_1$ is 9 ms, and the tolerance value for the job type $T_1$ is 8.08 ms, the virtual machine being used to execute the jobs of job type $T_1$ may be identified as under-performing. In another embodiment, a virtual machine may be identified as an under-performing virtual machine if the median of the actual execution times for jobs of a particular type executed on the virtual machine exceeds the threshold for the job type. For example, if the median of actual execution time for jobs of job type $T_1$ is 22 ms, and the threshold for the job type $T_1$ is 14.3±4.04 ms, the virtual machine being used to execute the jobs of job type $T_1$ may be identified as under-performing. Additionally, the above two embodiments may be combined to form a two part test to identify an under-performing virtual machine. In yet another embodiment, the two part test for a particular job type may be performed based on a comparison of the standard deviation and the median of the estimation errors for jobs of the particular type with the tolerance value and the threshold respectively. In such a scenario, a virtual machine would be identified as an under-performing virtual machine if the standard deviation of the estimation errors for jobs of a particular type executed on the virtual machine exceeds the tolerance value for the particular job type, and the median of the estimation errors for jobs of the particular type executed on the virtual machine exceeds the threshold for the particular job type. Further, the information associated with the one or more under-performing virtual machines is updated in the subscriber data 232.

Additionally, in an embodiment, a virtual machine may be identified as an under-performing virtual machine if the number of times the virtual machine exceeds the tolerance value or the threshold is greater than a pre-determined limit for a particular type of job executed on the virtual machine. For example, if the pre-determined limit is 3, the actual execution time of five jobs of type $T_1$ on a virtual machine are 12 ms, 20 ms, 16 ms, 18 ms, and 6 ms, the tolerance value for the job type $T_1$ is 8.08 ms, then the actual execution time of the virtual machine exceeds the tolerance value 4 times. Hence, the virtual machine may be identified as an under-performing virtual machine, as the number of times the virtual machine exceeds the tolerance value (i.e., 4 times) is more than the pre-determined limit (i.e., 3).

A person skilled in the art would understand that the scope of the disclosure with respect to the identification of the one or more under-performing virtual machines should not be restricted to the two part test or the check with respect to the pre-determined limit as described above. The disclosure may be implemented with one or more variations without departing from the scope of the disclosure.

At step 316, a calibration is performed on the one or more under-performing virtual machines. The job statistics module 222 performs the calibration on the one or more under-performing virtual machines. In an embodiment, a job with a known execution time (hereinafter referred to as a calibration job) derived from the performance data 228 is sent to the one or more under-performing virtual machines for execution by the job queue module 214. The calibration jobs are designed to test targeted computational resources of a virtual machine, and when executed, are used to better highlight areas of deficiency such as, but not limited to, poor performance, network bandwidth, disk bandwidth, unfair time slicing, etc.

At step 318, a check is performed to determine whether the one or more under-performing virtual machines meet requirements. During calibration, the job statistics module 222 computes execution time of the calibration job, based on turn-around time of the calibration job and the estimated network delays using the equation 1. In an embodiment, a virtual machine is deemed to be meeting the requirements when the execution time of the calibration job on the virtual machine is within a pre-determined threshold. In an embodiment, the predetermined threshold may correspond to a known execution time of the calibration job when executed on a virtual machine with characteristics similar to the virtual machine under-test. However, if the execution time exceeds the pre-determined threshold, the virtual machine is deemed as not meeting the requirements. In such a scenario, the job statistics module 222 prompts the transaction module 224, indicating the virtual machine as not meeting the requirements. If it is determined that the one or more under-performing virtual machines do not meet the requirements, step 320 is performed, and otherwise, step 322 is performed.

A person skilled in the art would understand that the process of the calibration of the one or more under-performing virtual machines (as described in steps 316 and 318) may be skipped without departing from the spirit of the disclosure.

At step 320, the one or more under-performing virtual machines are released. In an embodiment, in order to release the one or more under-performing virtual machines, the subscriber module 218 removes entries associated with the one or more under-performing virtual machines from the subscriber data 232. Further, the transaction module 224 communicates with the distributed computing service provider to cancel any transactions associated with the one or more under-performing virtual machines. Thereafter, a new set of virtual machines may be subscribed from the pool of virtual machines 114 for executing remaining of the one or more jobs. The subscription of the new set of virtual machines may be performed as described in step 306.

Additionally, in a scenario where an under-performing virtual machine is released, jobs that are still pending execution on the under-performing virtual machine or jobs that have been partially executed on the under-performing virtual machine are sent to the new set of virtual machines for execution. In an embodiment, a partially executed job may resume execution on the new set of virtual machines from a point of where its execution was suspended on the under-performing virtual machine. In another embodiment, a partially executed job may start execution afresh on the new set of virtual machines.

Further, in an alternate embodiment, the one or more under-performing virtual machines may complete the execution of ongoing jobs, but may not start executing any fresh job (i.e., unexecuted jobs queued for execution on such virtual machines). The one or more under-performing virtual machines may be released after the execution of the ongoing jobs is completed. Thereafter, the fresh jobs (i.e., the unexecuted jobs) may be sent for execution on the newly subscribed set of virtual machines.

Evaluating performance of the one or more under-performing virtual machines using calibration jobs ensures that these virtual machines are not unnecessarily released. It is possible that the responses received from the one or more under-performing virtual machines were unduly delayed due to network congestion (i.e., actual network delay might have been much more than the estimated network delay). Therefore, when the one or more under-performing virtual machines are tested by calibration jobs (as explained in steps 316 and 318), these virtual machines might be determined to be meeting the requirements and thus may be saved from being unduly released.

At step 322, the one or more subscribed virtual machines are continued for the remaining jobs. In an embodiment, if the execution time obtained during the calibration of step 316 does not exceed the predetermined threshold, the one or more virtual machines remain subscribed to service the remaining jobs in the queue data 226.

The method, system, and computer program product, as described above, have numerous advantages. The system 200 helps to monitor the performance and manage efficiently the usage of the pool of virtual machines 114 in the distributed computing environment 108. The system 200 helps in identifying and releasing the under-performing virtual machines so as to reduce the job execution times. Further, by reducing the job execution time, the system 200 satisfies the SLA terms and the QoS metrics. The system 200 dynamically decides the best virtual machines that should be employed to execute the jobs in the queue data 226, such that the SLA terms and the QoS metrics are met.

The disclosed methods and systems, as illustrated in the ongoing description or any of its components, may be embodied in the form of a computer system. Typical examples of a computer system include a general-purpose computer, a programmed microprocessor, a microcontroller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard disk drive or a removable storage drive, such as a floppy disk drive, optical disk drive, etc. The storage device may also be a means for loading computer programs or other instructions into the computer system. The computer system also includes a communication unit. The communication unit allows the computer to connect to other databases and the internet through an input/output (I/O) interface, allowing the transfer and reception of data from other databases. The communication unit may include a modem, an Ethernet card, or other similar devices, which enable the computer system to connect to databases and networks, such as LAN, MAN, WAN, and the internet. The computer system facilitates inputs from a user through an input device, accessible to the system through an I/O interface.

The computer system executes a set of instructions that are stored in one or more storage elements, in order to process input data. The storage elements may also hold data or other information, as desired. The storage element may be in the form of an information source or a physical memory element present in the processing machine.

The programmable or computer-readable instructions may include various commands that instruct the processing machine to perform specific tasks such as steps that constitute the method of the disclosure. The method and systems described can also be implemented using only software programming or hardware or by a varying combination of the two techniques. The disclosure is independent of the programming language and the operating system used in computers. The instructions for the disclosure can be written in all programming languages including, but not limited to, 'C', 'C++', 'Visual C++', and 'Visual Basic'. Further, the software may be in the form of a collection of separate programs, a program module containing a larger program, or a portion of a program module, as discussed in the ongoing description. The software may also include modular programming in the form of object-oriented programming. The processing of input data by the processing machine may be in response to user commands, results of previous processing, or a request made by another processing machine. The disclosure can also be implemented in various operating systems and platforms including, but not limited to, UNIX®, DOS®, ANDROID®, SYMBIAN®, WINDOWS®, AND LINUX®.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for managing virtual machines in a distributed computing environment have been disclosed. However, it should be apparent to those skilled in the art that many more modifications, besides those described, are possible without departing from the inventive concepts herein. The embodiments, therefore, are not to be restricted, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person with ordinary skills in the art will appreciate that the system, modules, and sub-modules have been illustrated and explained to serve as examples and should not be considered limiting in any manner. It will be further appreciated that the variants of the above-disclosed system elements, or modules and other features and functions, or alternatives thereof, may be combined to create many other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, etc.

The claims can encompass embodiments for hardware, software, or a combination thereof.

It will be appreciated that variants of the above disclosed, and other features and functions or alternatives thereof, may be combined into many other different systems or applications. Various presently unforeseen or unanticipated alternatives, modifications, variations, or improvements therein may be subsequently made by those skilled in the art that are also intended to be encompassed by the following claims.

What is claimed is:

1. A method for managing virtual machines in a distributed computing environment, the method comprising:
    determining, by one or more processors, an estimated execution time for each type of job in one or more first jobs received from users;
    subscribing, by the one or more processors, one or more virtual machines from a pool of virtual machines of the distributed computing environment to execute the each type of job in the one or more received first jobs, wherein the one or more virtual machines are subscribed based on service level agreement (SLA) terms, quality of service (QoS) metrics, and the estimated execution time associated with the each type of job in the one or more received first jobs;
    monitoring, by the one or more processors, an actual job execution time for each job from the one or more received first jobs executed on an associated subscribed virtual machine;
    identifying, by the one or more processors, one or more under-performing virtual machines from the one or more subscribed virtual machines based on the actual job execution time, the estimated execution time, and a tolerance value for the each type of job in the one or more received first jobs, wherein the tolerance value corresponds to an allowable deviation of the actual job execution time from the estimated execution time for the each type of job in the one or more received first jobs;
    executing, by the one or more processors, one or more second jobs, with known execution times, on the identified one or more under-performing virtual machines, when the actual job execution time of the each job from the one or more received first jobs on the identified one or more under-performing virtual machines has exceeded the estimated execution time and the tolerance value associated with each of the one or more received first jobs;

releasing, by the one or more processors, the one or more under-performing virtual machines to the distributed computing environment when the actual job execution time of the one or more second jobs exceeds the known execution time of the one or more second jobs; and re-subscribing, by the one or more processors, a new set of virtual machines from the pool of virtual machines of the distributed computing environment, such that the SLA terms and the QoS metrics are met.

2. The method of claim 1, wherein the determination of the estimated execution time of a type of job is based on at least one of a historical distribution of execution times of similar types of jobs, execution times of representative set of jobs of each type executed on the pool of virtual machines, or one or more parameters associated with the type of job.

3. The method of claim 1, wherein the actual execution time for each job in the one or more first jobs is determined from a response received from the associated subscribed virtual machine.

4. The method of claim 1, wherein the SLA terms correspond to a measure of a cost, accuracy, and a time of completion.

5. The method of claim 1, wherein each virtual machine has one or more computational resources comprising processor instances, storage space, and RAM space.

6. The method of claim 1 further comprising maintaining, by the one or more processors, a job queue of the one or more received first jobs.

7. The method of claim 1 further comprising maintaining, by the one or more processors, a log-record of errors for each subscribed virtual machine, wherein each error is a difference between the estimated execution time of a type of job and the actual execution time of a job of that type executed on the subscribed virtual machine.

8. The method of claim 7 further comprising determining, by the one or more processors, a standard deviation of the log-record of errors for each subscribed virtual machine.

9. The method of claim 8 further comprising receiving, by the one or more processors, the tolerance value for each type of job in the one or more received first jobs, wherein the tolerance value corresponds to a factor of the standard deviation of the log-record of errors for the associated subscribed virtual machine.

10. The method of claim 9, wherein a virtual machine is identified as an under-performing virtual machine when the error of the virtual machine exceeds the tolerance value.

11. The method of claim 7 further comprising receiving, by the one or more processors, a threshold corresponding to a median of the log-record of errors for each subscribed virtual machine.

12. The method of claim 11, wherein a virtual machine is identified as an under-performing virtual machine when the error of the virtual machine exceeds the threshold.

13. The method of claim 1 further comprising receiving, by the one or more processors, a limiting factor corresponding to the known execution time of the second job on a virtual machine.

14. The method of claim 13, wherein a virtual machine is identified as an under-performing virtual machine when the actual execution time of the second job on the virtual machine exceeds the received limiting factor.

15. The method of claim 1 further comprising comparing, by the one or more processors, the actual job execution time for each second job on the one or more under-performing virtual machines with the known execution time of the second job.

16. The method of claim 15 further comprising releasing, by the one or more processors, the one or more under-performing virtual machines, based on the comparison.

17. The method of claim 1 further comprising:

retaining, by the one or more processors, the one or more under-performing virtual machines for executing a set of ongoing jobs from the one or more received first jobs, wherein the set of ongoing jobs are currently being executed on the one or more under-performing virtual machines; and executing, by the one or more processors, a set of unexecuted jobs from the one or more received first jobs on the new set of virtual machines, wherein the set of unexecuted jobs corresponds to jobs queued for execution on the one or more under-performing virtual machines, other than the set of ongoing jobs.

18. A system for managing virtual machines in a distributed computing environment, the system comprising:

one or more processors configured to:

determine an estimated execution time for each type of job in one or more first jobs received from users;

subscribe one or more virtual machines from a pool of virtual machines of the distributed computing environment to execute the each type of job in the one or more received first jobs, wherein the one or more virtual machines are subscribed based on service level agreement (SLA) terms, quality of service (QoS) metrics, and the estimated execution time associated with the each type of job in the one or more received first jobs;

monitor an actual job execution time for each job from the one or more received first jobs executed on an associated subscribed virtual machine;

identify one or more under-performing virtual machines from the one or more subscribed virtual machines based on the actual job execution time, the estimated execution time, and a tolerance value for the each type of job in the one or more received first jobs, wherein the tolerance value corresponds to an allowable deviation of the actual job execution time from the estimated execution time for the each type of job in the one or more received first jobs;

execute one or more second jobs, with known execution times, on the identified one or more under-performing virtual machines, when the actual job execution time of the each job from the one or more received first jobs on the identified one or more under-performing virtual machines has exceeded the estimated execution time and the tolerance value associated with each of the one or more received first jobs;

release the one or more under-performing virtual machines to the distributed computing environment when the actual job execution time of the one or more second jobs exceeds the known execution time of the one or more second jobs; and re-subscribe a new set of virtual machines from the pool of virtual machines of the distributed computing environment, such that the SLA terms and the QoS metrics are met.

19. The system of claim 18, wherein the one or more processors are further operable to:

retain the one or more under-performing virtual machines for executing a set of ongoing jobs from the one or more received first jobs, wherein the set of ongoing jobs are currently being executed on the one or more under-performing virtual machines; and execute a set of unexecuted jobs from the one or more received first jobs on the new set of virtual machines, wherein the set of unexecuted jobs corresponds to jobs queued for execution on the one or more under-performing virtual machines, other than the set of ongoing jobs.

20. A computer program product for use with a computing device, the computer program product comprising a non-transitory computer readable medium, the non-transitory computer readable medium stores a computer program code for managing virtual machines in a distributed computing environment, the computer program code is executable by one or more processors in the computing device to:

determine an estimated execution time for each type of job in one or more first jobs received from users;

subscribe one or more virtual machines from a pool of virtual machines of the distributed computing environment to execute the each type of job in the one or more received first jobs, wherein the one or more virtual machines are subscribed based on service level agreement (SLA) terms, quality of service (QoS) metrics, and the estimated execution time associated with the each type of job in the one or more received first jobs;

monitor an actual job execution time for each job from the one or more received first jobs executed on an associated subscribed virtual machine;

identify one or more under-performing virtual machines from the one or more subscribed virtual machines based on the actual job execution time, the estimated execution time, and a tolerance value for the each type of job in the one or more received first jobs, wherein the tolerance value corresponds to an allowable deviation of the actual job execution time from the estimated execution time for the each type of job in the one or more received first jobs;

execute one or more second jobs, with known execution times, on the identified one or more under-performing virtual machines, when the actual job execution time of the each job from the one or more received first jobs on the identified one or more under-performing virtual machines has exceeded the estimated execution time and the tolerance value associated with each of the one or more received first jobs;

release the one or more under-performing virtual machines to the distributed computing environment when the actual job execution time of the one or more second jobs exceeds the known execution time of the one or more second jobs; and re-subscribe a new set of virtual machines from the pool of virtual machines of the distributed computing environment, such that the SLA terms and the QoS metrics are met.

* * * * *